(12) United States Patent
Aggarwal et al.

(10) Patent No.: US 6,721,719 B1
(45) Date of Patent: Apr. 13, 2004

(54) SYSTEM AND METHOD FOR CLASSIFICATION USING TIME SEQUENCES

(75) Inventors: Charu C. Aggarwal, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/361,381

(22) Filed: Jul. 26, 1999

(51) Int. Cl.$^7$ ................................................. G06N 5/02
(52) U.S. Cl. .......................................... 706/20; 706/48
(58) Field of Search ..................... 706/20, 48; 345/440; 367/135; 382/220; 600/544; 700/52; 702/15, 19; 704/200, 240, 248, 254; 707/7; 714/26

(56) References Cited

U.S. PATENT DOCUMENTS

| | | | | |
|---|---|---|---|---|
| 4,641,355 A | * | 2/1987 | Hongo et al. | 382/220 |
| 5,040,214 A | * | 8/1991 | Grossberg et al. | 704/240 |
| 5,056,150 A | * | 10/1991 | Yu et al. | 704/248 |
| 5,175,793 A | * | 12/1992 | Sakamoto et al. | 704/200 |
| 5,373,486 A | * | 12/1994 | Dowla et al. | 367/135 |
| 5,490,062 A | * | 2/1996 | Leach et al. | 702/15 |
| 5,832,183 A | * | 11/1998 | Shinohara et al. | 706/20 |
| 6,003,029 A | * | 12/1999 | Agrawal et al. | 707/7 |
| 6,105,149 A | * | 8/2000 | Bonissone et al. | 714/26 |
| 6,236,964 B1 | * | 5/2001 | Tamura et al. | 704/254 |
| 6,370,437 B1 | * | 4/2002 | Carter et al. | 700/52 |
| 6,473,084 B1 | * | 10/2002 | Phillips et al. | 345/440 |
| 6,493,637 B1 | * | 12/2002 | Steeg | 702/19 |
| 6,532,456 B1 | * | 3/2003 | Wang et al. | 706/48 |
| 6,549,804 B1 | * | 4/2003 | Osorio et al. | 600/544 |

OTHER PUBLICATIONS

"PLANMINE: Sequence Mining for Plan Failures", by Mohammed J. Zaki, et al., Computer Science Department, University of Rochester, Rochester NY, pp. 369–373.

"Rule discovery from time series", by Gautam Das, et al., 1998 American Association for Artificial Intelligence, pp. 16–22.

"Querying Shapes of Histories", by Rakesh Agrawal, et al., IBM Almaden Research Center, San Jose, CA, pp. 502–514.

"Mining Sequential Patterns", by Rakesh Agrawal, et al., IBM Almaden Research Center, San Jose, CA, pp 3–14.

"Mining Association Rules between Sets of Items in Large Databases", by Rakesh Agrawal, et al., IBM Almaden Research Center, San Jose, CA, pp. 207–216.

"A Probabilistic Approach to Fast Pattern Matching in Time Series Databases", by Eamonn Keogh, et al., Dept. of Information and computer Science, University of California, Irvine, CA, pp. 24–29.

"Learning to Predict Rare Events in Event Sequences", by Gary M.Weiss, et al., Department of Computer Science, Rutgers University, New Brunswick, NJ. pp. 359–363.

* cited by examiner

Primary Examiner—Wilbert L. Starks, Jr.
(74) Attorney, Agent, or Firm—Scully, Scott, Murphy & Presser; Gail H. Zarick, Esq.

(57) ABSTRACT

System and method for generating classification using time sequences comprises inputting a set of time dependant feature variable graphs along with a set of time dependant category variable graphs; finding frequent shapes in the time dependant feature variable graphs; utilizing the frequent shapes to generate combinations of frequent shapes; generating rules relating one or more patterns of combinations of frequent shapes to a category variable; and, performing a categorization utilizing the rules generated.

26 Claims, 7 Drawing Sheets

SYSTEM AND METHOD FOR CLASSIFICATION USING TIME SEQUENCES

BACKGROUND OF THE INVENTION

1. Field of the Invention

The present invention relates generally to systems and methods for classifying time sequences, and particularly, to a system and method for making time-dependant class predictions.

2. Discussion of the Prior Art

Classification of time sequences has great utility in providing important predictability information for time sequences, and particularly, time-series data has great applicability in business. For example, the stock prices at the New York Stock Exchange are based on time-sequence behavior of the corresponding stocks. Such data has great use in providing important predictability information for time sequences.

Methods for mining sequential patterns in time series data have been proposed by Agrawal et al., in the reference "Mining Sequential Patterns," Proceedings of the Eleventh International Conference on Data Engineering (ICDE 95), pp. 3–14, (1995). These algorithms find the frequent time series which occur in these patterns. The algorithms discussed in this work are related to the large itemset mining methods proposed by Agrawal, Imielinski, and Swami in the reference entitled "Mining Association Rules Between Sets of Items in Large Databases," Proceedings of the ACM SIGMOD Conference on the Management of Data (SIGMOD 93), 207–216, Washington D.C., USA.

Methods for discovering frequent episodes in event sequences have been discussed in the reference entitled "Discovery of Frequent Episodes in Event Sequences," Data mining and Knowledge Discovery 1(3), pp. 259–289 by H. Mannila, H. Toivonen, A. I. Verkamo. In this work, frequent patterns of behavior (referred to as episodes) are detected by a computationally efficient data mining algorithm. Other work relating to pattern matching and predicting rare events in time sequences may be found in E. Keogh, and P. Smyth "A Probabilistic Approach to Fast Pattern Matching in Time-Series Databases," Proceedings of the Knowledge Discovery and Data Mining Conference, 1997, and, in G. M. Weiss and H. Hirsh "Learning to Predict Rare Events in Event Sequences," Proceedings of the Knowledge Discovery and Data Mining Conference, 1998 pages 359–363. Methods for mining and finding plan failures have been discussed in the reference entitled "PLANMINE: Sequence Mining for Plan Failures,". Proceedings of the Knowledge Discovery and Data Mining Conference, 1998 pages 369–373 to M. J. Zaki, N. Lesh, M. Ogihara.

The above-mentioned references do not teach how to perform a time-dependant categorization given inputs of both feature variables that are a function of time and correspond to various time-dependant graphs and, time-dependant category variables which may take on one of several categorical values which and correspond to time-dependant graphs.

Thus, it would be highly desirable to provide a system and method for performing a time-dependant categorization, when both the feature variables and the category variables are time-dependant graphs.

SUMMARY OF THE INVENTION

The present invention is directed to a system and method for performing time-dependant classification of sequences which requires a finding of the frequent combinations of shapes which imply a given class variable at a given time-stamp.

According to the invention, there is provided a system and method for generating classification using time sequences comprising: receiving a set of time dependant feature variable graphs and a set of time dependant category variable graphs; finding frequent shapes in the time dependant feature variable graphs; utilizing the frequent shapes to generate combinations of frequent shapes; generating rules relating one or more patterns of combinations of frequent shapes to a category variable; and, performing a categorization utilizing the rules generated.

Advantageously, the present invention is useful for finding predictive relationships between the feature variables found in time dependant feature variable graphs and the class or category variable from corresponding time dependant category variable graphs.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

The present invention is directed to a system and method for performing categorization of time sequences when data comprising both feature variables and category variables are time-dependant graphs.

Specifically, a description of the data sources required for implementing the methodology of the invention are now described: 1a) a set of K time-dependent feature variable graphs. For example, in a stock-market analogy utilized as an example described herein, the K feature variables may correspond to the various time-dependant graphs affecting stock behavior, such as the price, earnings, and stock price, etc.; and 2a) a single time-dependant category variable. This variable may take on one of several categorical values, which are also a time-dependant function. For example, for stock-prices, this category variable may be buy, hold, or sell which indicates the recommendation as to whether an investor should buy, hold, or sell the stock.

Each such set of variables is referred to herein as the feature-category graph set. According to the invention, it is assumed that a large number of feature-category graph sets are available which form a basis of performing a training operation as will be described. The prediction problem is the following:

Given the following test graph set: 1b) a set of K time-dependant feature variable graphs. For example, in the stock-market analogy, the K feature variable graphs may correspond to the various time-dependant graphs affecting stock behavior, such as the price, earnings, and stock price. This is similar to the feature set provided in 1a) above; and, 2b) a time stamp. It is desirable to predict the categorical variable at the time stamp provided in 2b) using a modeling procedure on the training data (of (1a) and (2a)) and the feature variable graphs of (2a) as the test instance.

The present invention uses a rule-based technique in order to perform the time-dependant categorization. In this rule-based technique, the time series data is first DISCRETIZED and the various SHAPES in the feature graphs which considerably influence the behavior of the category graphs are found. Particularly, the process of discretization involves dividing the behavior of the graphs into several discrete time intervals. For example, consider the case when the feature variable corresponds to the stock price, and the value of the stock price is captured at one hour intervals. An example of such a sequence a) of length 8 hours may be:

a) 2.5 50.25 53.75 54.125 55.25 57.0 56.25 56.5

Each value in the sequence a) corresponds to the stock price at the end of the hour. Next, this sequence is converted into an up-down (U-D) sequence. A "U" corresponds to an upward movement in the stock price in the past hour, while a D corresponds to a downwards movement. For the sequence a) above, the U-D sequence is as follows:

b) D-U-U-U-U-D-U

A SHAPE corresponds to a contiguous sequence of U-D movements in the feature variable value. For the stock market example above, the last three periods exhibit a shape of U-D-U.

According to the invention, the first step is to perform training on the data set in order to build a model which relates the feature graphs to the time dependant category variable. This process consists of the following steps:

(1) a first phase involves finding the set of all FREQUENT SHAPES in the data. Note that a different set of shapes may be had for each feature variable. For the stock market example described herein, there may be one set of shapes corresponding to the feature variable price, another set of shapes corresponding to the feature variable earnings, and yet another set of shapes corresponding to the feature variable for the price/earnings ratio. The set of frequent shapes denotes the set of all trends which are used for the categorization.

In order to find out which shapes are frequent, a measure referred to as the SUPPORT (of a shape) is used which is the percentage of all the feature variable graphs which contain that shape. Thus, all the shapes are found which satisfy a minimum predetermined threshold referred to as the minimum support. For the stock market example, considering a case when there are feature variable graphs corresponding to ten-thousand different stocks, a minimum support of 2% for a shape for stock prices refers to the fact that at least 200 stocks show that particular shape in their trend patterns for stock prices. The detailed steps of how the frequent shapes are found will be discussed in greater detail with reference to FIG. 4.

(2) a second phase of the process is to find all the combinations of shapes which have sufficient support. For the stock market example, a case is considered when the following two frequent shapes are found for the feature variables corresponding to stock price and stock earnings:

Stock Price: UDUUD

Stock Earnings: UDDDU

Then the itemset <Price-UDUUD, Earnings-UDDDU> corresponds to the case when a stock shows both the above patterns somewhere on its time-dependant graph of behavior. The above patterns for price and earnings must be of the same length, and must occur during the same time-period. The support of such a pattern is given by the percentage of graphs which show this combination of patterns.

(3) a third phase of the process requires finding the rules which relate these patterns to the category variable. A rule is of the following form:

<Pattern1, Pattern2> ===Time Lag===> Categorical Class Variable Value

For the stock market example, a possible example of a rule may be:

<Price-UDUUD, Earnings-UDDDU>===1 week===> Stock Recommendation=Buy

This rule refers to the fact that the class variable holds true for the specified time-lag from the end of the sequential patterns. The strength of a rule is measured by its confidence which is defined as the percentage of the time that the rule is true, when the antecedent conditions are true.

(4) in the last phase, the rules are utilized in order to perform the categorization. In order to do so, all the rules for which there is a pattern matching the current test instance are checked. These rules are then used in order to perform the categorization.

Figure 2:
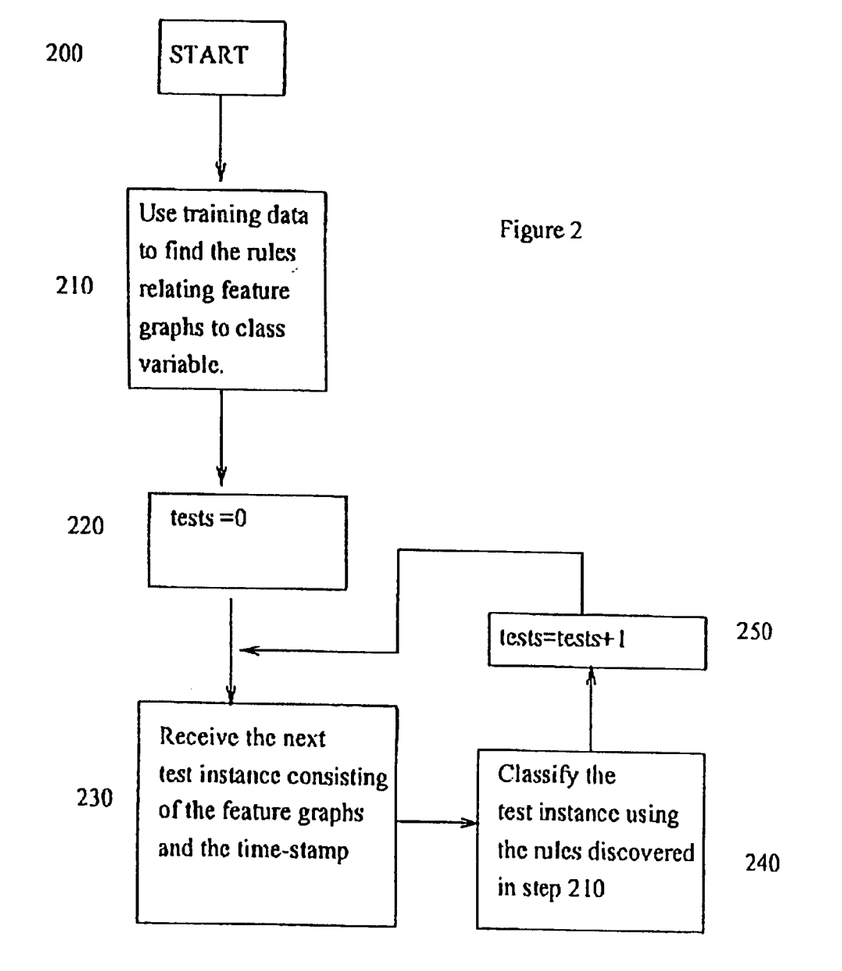
FIG. 2 is a process flow chart illustrating the methodology for performing the training and testing according to the first phase of the invention.

The overall process of how the method is used for training and subsequent categorization is illustrated in FIG. 2. At step 210 a process is implemented to perform training on the data set in order to find the rules relating the feature variable to the class variable. Particularly, at step 220, a counter variable 'tests' is initialized for tracking the test instant comprising the feature graphs, in addition to the time stamps of the data. At step 230, a next test instance is received which comprises the feature graphs and the time-stamp. Then, at step 240, the test instance is classified utilizing the rules discovered at step 210. At step 250, the counter "tests" is incremented by 1, and the process proceeds to step 230 for receipt of the next test instance.

Figure 3:
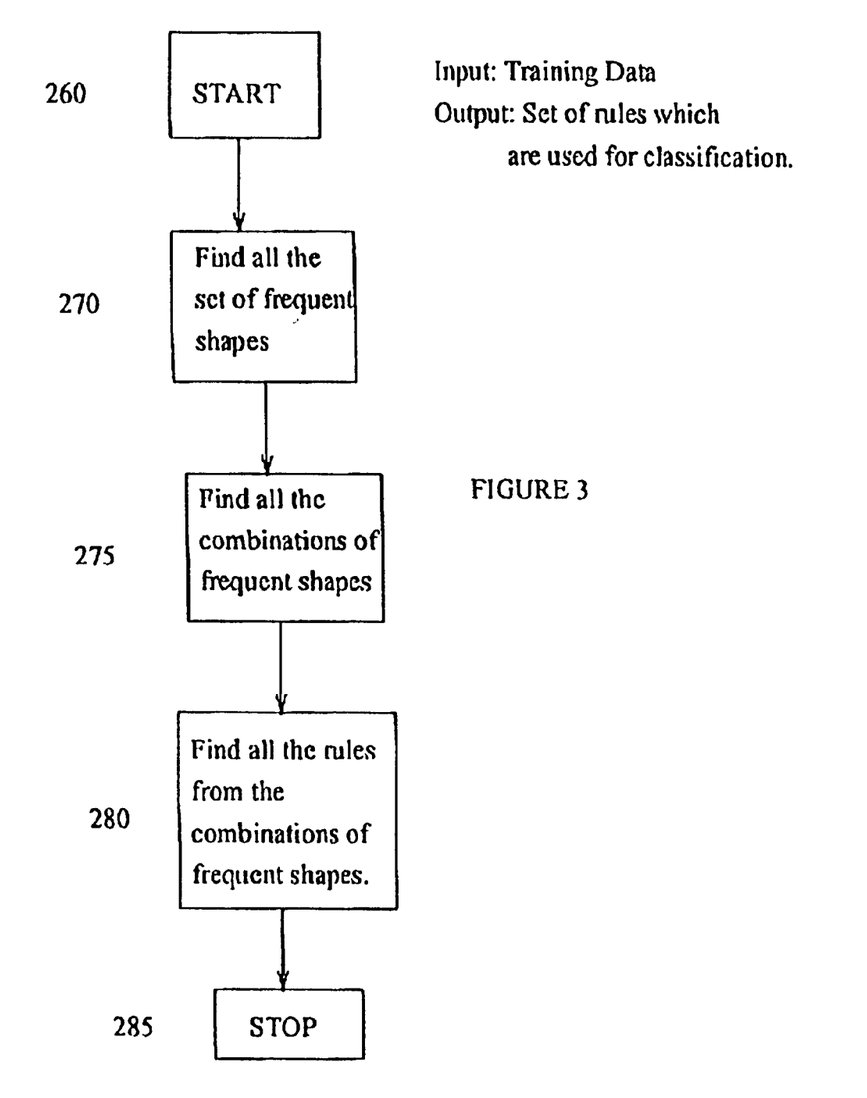
FIG. 3 is a detailed process flow chart illustrating the training procedure implemented by the present invention.

Referring now to FIG. 3, there is depicted a detailed description of how the training data input may be used to find the rules which relate the feature variables to the class variable. It can be considered a detailed description of step 210 of FIG. 2. The process of generating the rules comprises the following stages: 1) finding all the set of frequent shapes (step 270); 2) finding all the combinations of frequent shapes (step 275); and, 3) finding all the rules from the combinations of frequent shapes (step 280).

Figure 4:
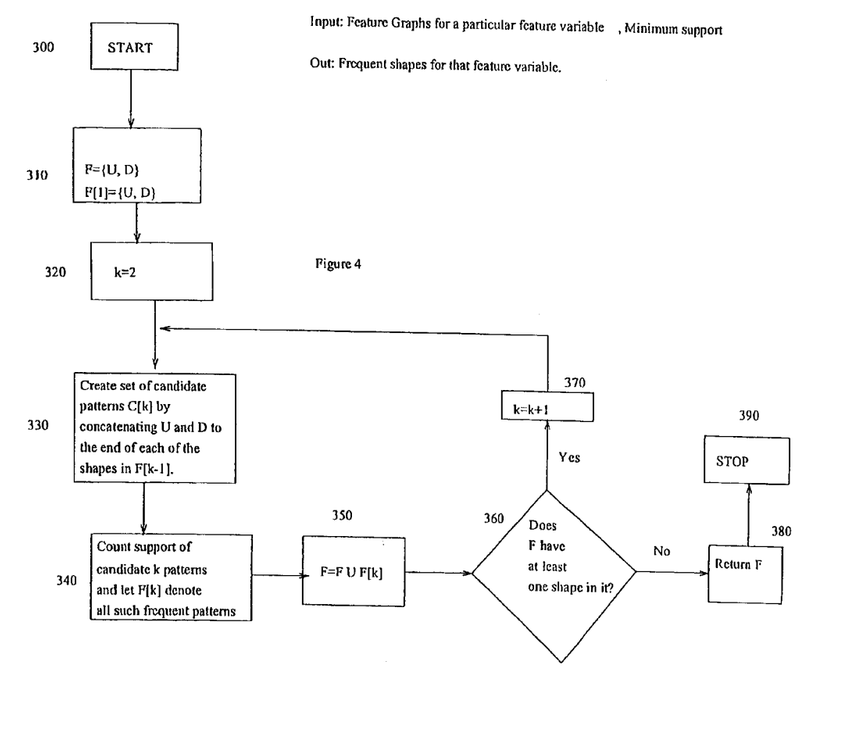
FIG. 4 is a detailed flow chart illustrating the process of finding the frequent shapes according to the methodology of the invention.

FIG. 4 is an illustration of the process for finding the frequent shapes from the data which can be considered a detailed description of step 270 of FIG. 3. The input to the process are the feature variable graphs for a particular feature variable and the minimum support. Thus, in order to complete the step 270, the process in FIG. 3 is to be executed for each feature variable. Letting "F" denote the set of all frequent shapes, and "F[k]" denote the set of all the shapes of length k, the most trivial shapes are the unit length shapes U and D of length 1. In fact, there are only two shapes possible of length 1. At step 320, the variable "k" is set to 2 which functions as a counter and additionally indicates the length of a given shape. At step 330, the set of candidate patterns C[k] are created by appending the items U or D, for example, to the end of the shapes in F[k−1]. Thus, for the example given, F[2]={UU,DD,UD,DU} At step 340, the support of each of these candidate patterns C[k] is counted which is found by calculating the percentage of feature variable graphs in which that candidate occurs. Then, at step 350, the set of frequent shapes F is updated by adding F[k] to this set. In step 360, a determination is made as to whether F[k] has at least one shape in it, i.e., if at least one frequent shape was generated in the most recent iteration. If F[k] does not have at least one shape in it, then the set F is returned at step 380 and the procedure terminates at step 390. Otherwise, the counter k is incremented by 1 at step 370 and the process returns to step 330 to create a new set of candidate patterns.

Figure 5:
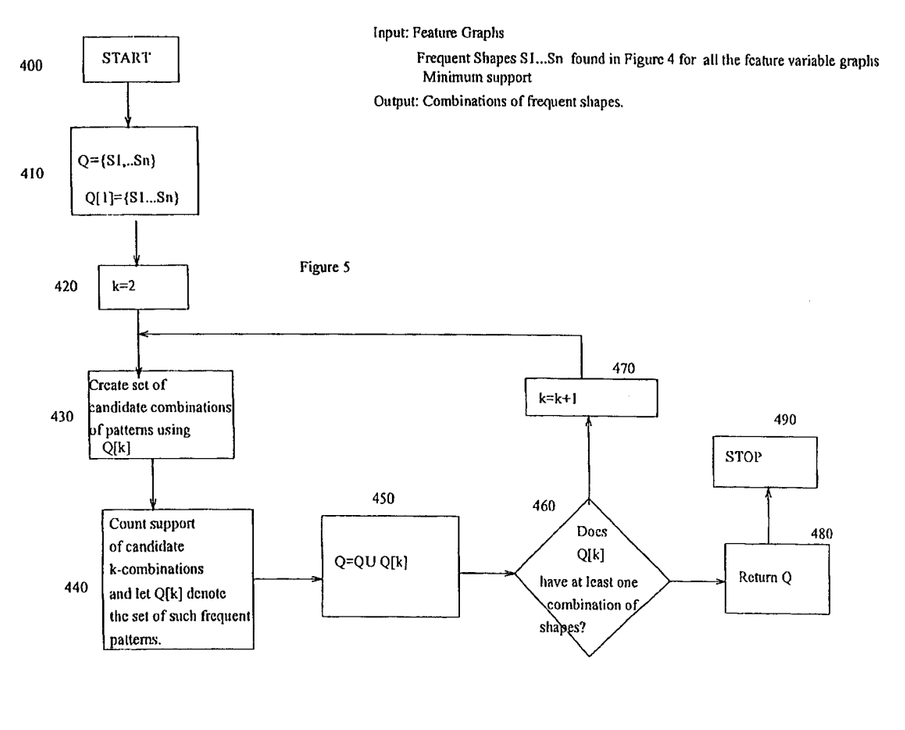
FIG. 5 is a detailed process flow chart illustrating the process for finding the combinations of frequent shapes according to step 275 of FIG. 3.

FIG. 5 illustrates the methodology for finding the frequent combinations of shapes which are used in order to generate the rules. The variable Q denotes the frequent combinations of shapes which are generated by the algorithm. The variable Q[k] denotes the combinations of the various shapes {S1, . . . Sn} for k different feature variables. The input to the process depicted in FIG. 5 is the set of frequent shapes generated in FIG. 4 for all the feature variable graphs. Thus, the input to the FIG. 5 is the output of all the executions of the procedure of FIG. 4 for each feature variable graph. Thus, as indicated at step 430, the set of candidate combinations of patterns is created using Q[k]. The creation of the combination of patterns is done by matching all combinations of equal length for different feature graphs.

In accordance with the stock market example as described herein, consider that the following two shapes lie in F[1].

Price: UUDUD

Earnings: UDUDD

In that case, one possible combination of shapes may be <Price-UUDUD, Earnings-UDUDD>. This refers to the fact that the above defined combinations of shapes for price and earnings occur during the same time period. Thus, the support of a combination of shapes is defined by the percentage of feature variable graphs in which the prespecified shapes occur during the same time period.

Then, at step 440, a counting of the support of candidate k-combinations is performed, and a set Q[k] is generated which denotes the set of such frequent patterns. The set Q[k] is added to Q at step 450, FIG. 5. Then at step 460, a determination is made as to whether the set Q[k] is null. If the set Q[k] is null, then the set Q is returned at step 480, and the method terminates at step 490. Otherwise, the counter K is incremented by 1 at step 470 and the process returns to step 430.

Figure 6:
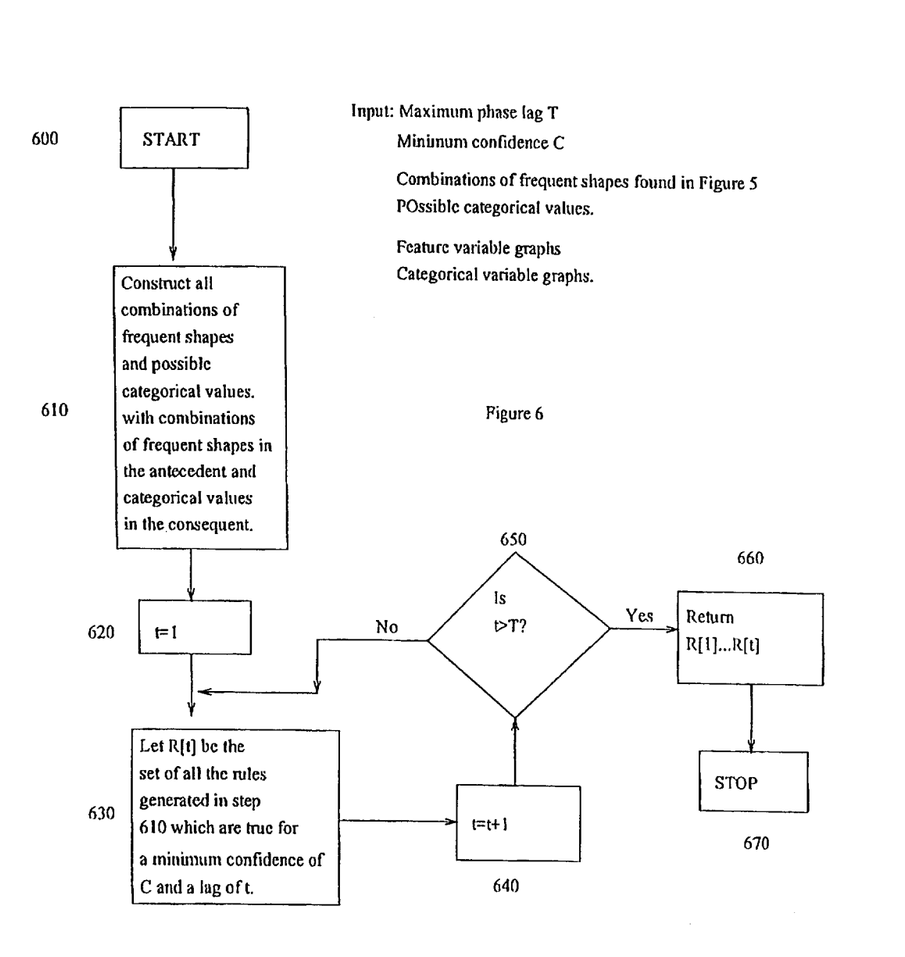
FIG. 6 is a detailed process flow chart illustrating the process of finding the rules from the combinations of frequent shapes according to step 280 of FIG. 3.

FIG. 6 illustrates the process for generating rules from the combinations of frequent shapes obtained in FIG. 5. In FIG. 6 at step 610, the output of the process of FIG. 5 is used in order to generate all the possible sets of rules. Consider for example, the case when the set of combinations are as follows:

<Price-UUD, Earnings-UDU>

<Price-UUU, Revenue-DUD>

Consider additionally the case when the possible categorical values are as follows:

Recommendation=Buy

Recommendation=Sell

Recommendation=Hold

For this example, the sets of possible rules are as follows:

<Price-UUD, Earnings-UDU>==>Recommendation=Buy

<Price-UUD, Earnings-UDU>==>Recommendation=Hold

<Price-UUD, Earnings-UDU>==>Recommendation=Sell

<Price-UUU, Revenue-DUD>==>Recommendation=Buy

<Price-UUU, Revenue-DUD>==>Recommendation=Hold

<Price-UUU, Revenue-DUD>==>Recommendation=Sell

Note that the rules generated in step 610 do not take phase lag into account. Thus, the next step is to generate the rules while also taking the phase lag into account. Process steps 620 through 660 generate the time-lagged rules using the primitive set of rules discussed above. In order to facilitate the process, it is assumed that only those rules which have a maximum phase lag of T will be generated. Thus, as shown in FIG. 6, at step 620, a variable "t" denoting the counter which represents the phase lag in terms of time is initialized to 1. Then, in an iterative process depicted from steps 630–650, all the possible rules which have a phase lag of 1, . . . ,T, using the rules generated in step 610 are generated. That is, in each iteration, all the rules are found which have a phase lag of t units. At step 630, the set R[t] is determined which is the set of all the rules which are true for a minimum confidence of C and a lag of t. This is done by taking each rule which is generated in step 610, and checking the confidence of the rule for a phase lag of t units. In step 640, the counter t is incremented by one unit, and, at step 650, a determination is made as to whether t>T. If t>T, then control is returned back to the step 630. Otherwise, at step 660, the set R[1], . . . , R[T]. These are the different rules for the different values of the phase lag.

Figure 7:
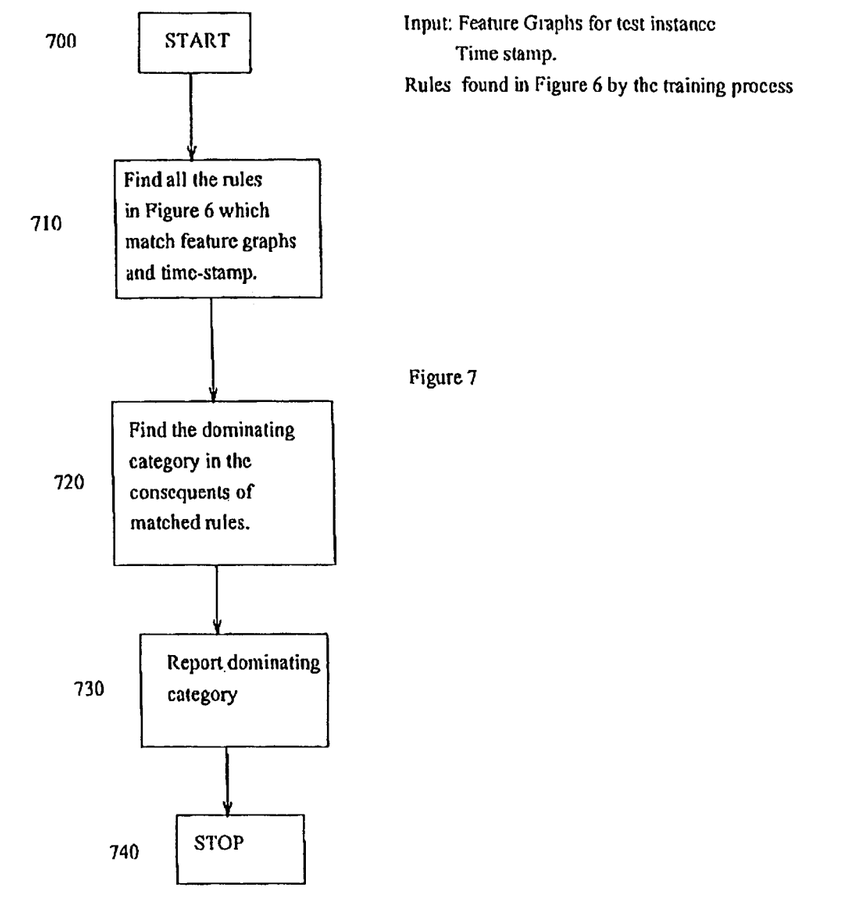
FIG. 7 is a detailed process flow chart illustrating the utilization of the rules in order to predict the categorical variable.

FIG. 7 describes the process of how to perform the classification at a given time stamp. The first step 710 requires a determination of all the rules whose antecedents are matched, i.e., all those rules in R[t] for which the antecedent of the rule occurred in the feature graphs. At step 720, the most commonly occurring categories in the consequents of the matched rules are found and the dominating categories are reported at step 730.

Figure 1:
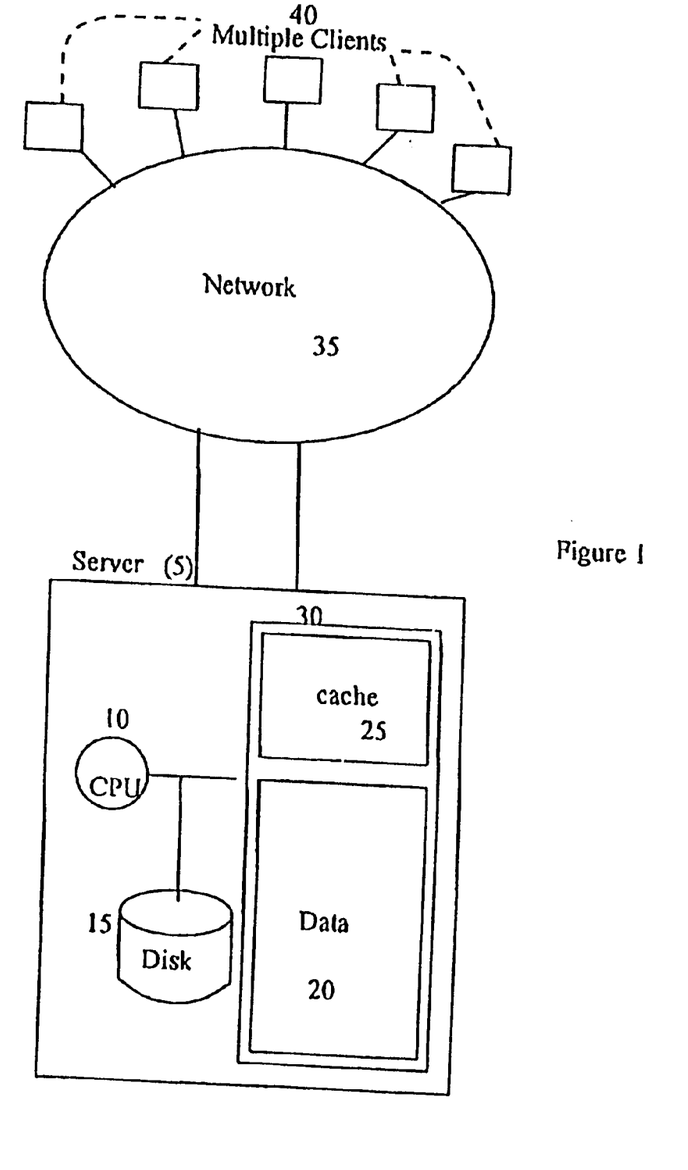
FIG. 1 is an illustration of the system architecture for implementing the methodology of the present invention.

The system architecture 50 for carrying out the methodology of the invention is illustrated in FIG. 1. As shown in FIG. 1, the system includes server 5 comprising a central processing unit (CPU) 10, with the data maintained at the server 5 either in main memory 20 or on a disk 15. In addition, a memory cache 25 is available for improving data processing performance according to conventional techniques. Data maintained at the server 5 may be accessed and used by multiple clients, represented as computer terminals or workstations 40, over a network 35, e.g., Ethernet or like equivalent, for the purpose of categorizing time sequences as described herein.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. Method of generating classification using time sequences comprising the steps of:

(a) receiving a set of time dependant feature variable graphs and a set of time dependant category variable graphs;

(b) finding frequent shapes in the time dependant feature variable graphs;

(c) utilizing frequent shapes in step b) to generate combinations of frequent shapes;

(d) generating rules relating one or more patterns of combinations of frequent shapes to a category variable; and, (e) performing a time-dependent categorization utilizing the rules generated in step d).

2. The method as claimed in claim 1, wherein said step e) of performing a categorization includes:

checking all rules for which there is a pattern matching the current test instance, a test instance comprising a set of feature variable graphs and a time stamp;

predicting a categorical variable at an input time stamp; and, outputting said categorical variable.

3. The method as claimed in claim 2, wherein said step b) of finding frequent shapes in the time dependant feature variable graphs comprises iteratively determining (k+1)-shapes after finding k-shapes, with k being a length of a shape in contiguous time intervals.

4. The method as claimed in claim 1, wherein said step b) of finding frequent shapes in the time dependant feature variable graphs further includes:

discretizing behavior of each said graph into a plurality of time intervals; and, determining contiguous sequences of movement in time of the feature variable value in each said graph to generate a shape.

5. The method as claimed in claim 4, wherein said step b) of finding frequent shapes further includes:

determining a support for each said shape found, said support representing a percentage of all input feature variable graphs which contain said determined shape; and, setting as a frequent shape those shapes meeting a minimum support threshold.

6. The method as claimed in claim 1, wherein said step c) of generating combinations includes the step of combining the frequent shape patterns found in step b), each frequent shape pattern being of a same length and occurring during a same time-period.

7. The method as claimed in claim 1, wherein said step d) of generating possible rules includes:

constructing all combinations of frequent shapes as an antecedent condition;

relating each possible combination with a possible categorical value as a consequent; and, determining a rule that meets a minimum confidence value defined as a percentage of time that the rule is true given true antecedent conditions.

8. The method as claimed in claim 7, wherein said possible rules generated in step d) further includes:

denoting a phase lag of predetermined time t units for each possible rule, with a phase lag representing a duration of time from an end of a frequent shape time period that a categorical variable holds true; and, determining a rule that meets a minimum confidence and a phase lag of time t units.

9. The method as claimed in claim 8, wherein said step of determining possible rules is an iterative process with each iteration having a different phase lag of t units, whereby in each iteration, rules are found having a time lag of t units.

10. The method as claimed in claim 8, wherein said step (e) includes performing a categorization at a given time stamp and given feature variable graphs, said step e) including:

finding all rules having antecedent matches in said given feature variable graphs; and, ascertaining most commonly occurring categorical variable in consequents of said matched rules.

11. A program storage device readable by a machine, tangibly embodying a program of instructions executable by the machine to perform method steps for generating classification using time sequences, said method steps comprising:

(a) receiving a set of time dependant feature variable graphs and a set of time dependant category variable graphs;

(b) finding frequent shapes in the time dependant feature variable graphs;

(c) utilizing frequent shapes in step b) to generate combinations of frequent shapes;

(d) generating rules relating one or more patterns of combinations of frequent shapes to a category variable; and, (e) performing a time-dependent categorization utilizing the rules generated in step d).

12. The program storage device readable by a machine as claimed in claim 11, wherein said step e) of performing a categorization includes:

checking all rules for which there is a pattern matching the current test instance, a test instance comprising a set of feature variable graphs and a time stamp;

predicting a categorical variable at an input time stamp; and, outputting said categorical variable.

13. The program storage device readable by a machine as claimed in claim 12, wherein said step b) of finding frequent shapes in the time dependant feature variable graphs comprises iteratively determining (k+1)-shapes after finding k-shapes, with k being a length of a shape in contiguous time intervals.

14. The program storage device readable by a machine as claimed in claim 11, wherein said step b) of finding frequent shapes in the time dependant feature variable graphs further includes:

discretizing behavior of each said graph into a plurality of time intervals; and, determining contiguous sequences of movement in time of the feature variable value in each said graph to generate a shape.

15. The program storage device readable by a machine as claimed in claim 14, wherein said step b) of finding frequent shapes further includes:

determining a support for each said shape found, said support representing a percentage of all input feature variable graphs which contain said determined shape; and, setting as a frequent shape those shapes meeting a minimum support threshold.

16. The program storage device readable by a machine as claimed in claim 11, wherein said step c) of generating combinations includes the step of combining the frequent shape patterns found in step b), each frequent shape pattern being of a same length and occurring during a same time-period.

17. The program storage device readable by a machine as claimed in claim 11, wherein said step d) of generating possible rules includes:

constructing all combinations of frequent shapes as an antecedent condition;

relating each possible combination with a possible categorical value as a consequent; and, determining a rule that meets a minimum confidence value defined as a percentage of time that the rule is time given true antecedent conditions.

18. The program storage device readable by a machine as claimed in claim 17, wherein said possible rules generated in step d) further includes:

denoting a phase lag of predetermined time t units for each possible rule, with a phase lag representing a duration of time from an end of a frequent shape time period that a categorical variable holds true; and, determining a rule that meets a minimum confidence and a phase lag of time t units.

19. The program storage device readable by a machine as claimed in claim 18, wherein said step of determining possible rules is an iterative process with each iteration having a different phase lag of t units, whereby in each iteration, rules are found having a time lag of t units.

20. The program storage device readable by a machine as claimed in claim 18, wherein said step (e) includes performing a categorization at a given time stamp and given feature variable graphs, said step e) including:

finding all rules having antecedent matches in said given feature variable graphs; and, ascertaining most commonly occurring categorical variable in consequents of said matched rules for output thereof.

21. System for generating classifications using time sequences comprising the steps of:

means for storing data representing a set of time dependant feature variable graphs along with a set of time dependant category variable graphs;

means for generating a possible set of rules relating one or more variables of said set of time dependant feature variable graphs to a categorical variable of said time dependant category variable graphs;

means for receiving a test instance comprising a further set of time dependent variable graphs and a user-defined time stamp; and, means for predicting from said rules a categorical variable at said user-defined time stamp.

22. The system as claimed in claim 21, wherein said means for generating a possible set of rules comprises:

means for finding frequent shapes in said stored time dependant feature variable graphs;

means for utilizing frequent shapes to generate combinations of frequent shapes, said generating means generating rules relating one or more patterns of combinations of frequent shapes to a category variable.

23. The system as claimed in claim 22, wherein said means for finding frequent shapes in the time dependant feature variable graphs further includes:

means for discretizing behavior of each said graph into a plurality of time intervals; and, means for determining contiguous sequences of movement in time of the feature variable value in each said graph to generate a shape.

24. The system as claimed in claim 23, wherein said means for finding frequent shapes further includes means for applying a support threshold for each said shape found and establishing a frequent shape as those shapes meeting said minimum support threshold.

25. The system as claimed in claim 24, wherein said means for generating a possible set of rules further comprises:

means for constructing all combinations of frequent shapes as an antecedent condition and relating each possible combination with a possible categorical value as a consequent; and, means for applying a minimum confidence criteria to each generated rule and establishing a rule when a confidence criteria is met.

26. The system as claimed in claim 25, wherein said means for predicting from said rules a categorical variable at said user-defined time stamp fixer includes:

means for finding all rules having antecedent matches in said given time dependent feature variable graphs;

means for determining most commonly occuring categorical variable in consequents of said matched rules; and, means for outputting said most commonly occurring categorical variable.

\* \* \* \* \*

UNITED STATES PATENT AND TRADEMARK OFFICE
CERTIFICATE OF CORRECTION

PATENT NO. : 6,721,719 B1
DATED : April 13, 2004
INVENTOR(S) : Charu C. Aggarwal et al.

It is certified that error appears in the above-identified patent and that said Letters Patent is hereby corrected as shown below:

Column 9,
Line 3, "time given true" should read -- true given true --.

Column 10,
Line 34, "time stamp fixer includes" should read -- time stamp further includes --.

Signed and Sealed this

Tenth Day of January, 2006

JON W. DUDAS
*Director of the United States Patent and Trademark Office*